US009225711B1

(12) United States Patent
Sorensen

(10) Patent No.: US 9,225,711 B1
(45) Date of Patent: Dec. 29, 2015

(54) TRANSFERRING AN AUTHENTICATED SESSION BETWEEN SECURITY CONTEXTS

(71) Applicant: FMR LLC, Boston, MA (US)

(72) Inventor: Carolyn Manis Sorensen, Salt Lake City, UT (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/711,870

(22) Filed: May 14, 2015

(51) Int. Cl.
*H04L 29/06* (2006.01)
*H04W 12/06* (2009.01)
*G06F 21/44* (2013.01)

(52) U.S. Cl.
CPC ............. *H04L 63/08* (2013.01); *G06F 21/44* (2013.01); *H04L 63/12* (2013.01); *H04W 12/06* (2013.01)

(58) Field of Classification Search
CPC . H04L 63/08; H04L 63/0807; H04L 63/0815; H04L 63/10; H04L 63/0838; H04L 63/12; H04W 12/06; G06F 21/44
See application file for complete search history.

(56) References Cited

U.S. PATENT DOCUMENTS

| | | | |
|---|---|---|---|
| 7,221,935 B2 | 5/2007 | Barriga-Caceres et al. | |
| 8,566,917 B2 | 10/2013 | Vangpat et al. | |
| 8,707,409 B2 | 4/2014 | Shah et al. | |
| 8,769,651 B2 | 7/2014 | Grajek et al. | |
| 8,819,803 B1* | 8/2014 | Richards et al. | 726/9 |
| 8,856,887 B2 | 10/2014 | Field-Eliot et al. | |
| 8,959,609 B1* | 2/2015 | Newstadt et al. | 726/9 |
| 2003/0135628 A1* | 7/2003 | Fletcher et al. | 709/229 |
| 2003/0163733 A1* | 8/2003 | Barriga-Caceres et al. | 713/201 |
| 2004/0128506 A1* | 7/2004 | Blakley, III | H04L 63/0815 713/170 |
| 2005/0076248 A1* | 4/2005 | Cahill | G06Q 20/0855 726/19 |
| 2005/0097352 A1* | 5/2005 | Patrick | H04L 63/20 726/26 |
| 2006/0136990 A1* | 6/2006 | Hinton | H04L 63/0815 726/2 |
| 2006/0218625 A1* | 9/2006 | Pearson et al. | 726/4 |
| 2007/0245411 A1 | 10/2007 | Newton | |
| 2009/0282239 A1* | 11/2009 | Doleh | 713/155 |
| 2010/0071056 A1* | 3/2010 | Cheng et al. | 726/16 |
| 2012/0011578 A1 | 1/2012 | Hinton et al. | |
| 2012/0151568 A1* | 6/2012 | Pieczul et al. | 726/8 |

(Continued)

OTHER PUBLICATIONS

Ryan Fass, "Why is mobile single sign-on taking so long?", CITEworld, IDG Enterprise, dated May 9, 2014 (5 pages).

(Continued)

*Primary Examiner* — Darren B Schwartz
(74) *Attorney, Agent, or Firm* — Proskauer Rose LLP

(57) ABSTRACT

Methods and apparatuses are described for transferring an authenticated session between security contexts. A mobile device establishes a first authenticated session between a native application and a server computing device via a communications network and requests transfer of the first authenticated session to a browser application. The mobile device receives session transfer parameters from a first Security Assertion Markup Language (SAML) authentication system associated with the first authenticated session after transfer is requested, the session transfer parameters including a web address and a SAML security identifier. The mobile device directs the browser application to a second SAML authentication system using the session transfer parameters to initialize the browser application and validates the SAML identifier at the SAML authentication system to generate an authentication credential. The mobile device authenticates the browser application to the server computing device using the authentication credential and redirects the browser application to the server computing device.

25 Claims, 4 Drawing Sheets

(56) References Cited

U.S. PATENT DOCUMENTS

| | | | |
|---|---|---|---|
| 2013/0086669 A1 | 4/2013 | Sondhi et al. | |
| 2014/0165150 A1 | 6/2014 | Brunswig et al. | |
| 2014/0189834 A1 | 7/2014 | Metke et al. | |
| 2014/0230042 A1 | 8/2014 | Moore | |
| 2014/0282919 A1* | 9/2014 | Mason | 726/4 |
| 2014/0310792 A1 | 10/2014 | Hyland et al. | |
| 2014/0337953 A1* | 11/2014 | Banatwala et al. | 726/8 |
| 2015/0007299 A1 | 1/2015 | Grajek et al. | |

OTHER PUBLICATIONS

"Mobile Single Sign-on for SAP Fiori using SAP Authenticator", retrieved from http://www.sap.com, dated 2014 (23 pages).

"Landscapes in Mobile Application Security," retrieved from http://it-io.com/article/17922350125413262868.html, dated Jun. 4, 2014 (8 pages).

Sumana Annam, "Ideal solution for SSO across native mobile applications," retrieved from http://blog.centrify.com/ideal-solution-for-sso-across-native-mobile-applications/, dated Jun. 3, 2014 (4 pages).

"A Standards-based Mobile Application IdM Architecture", Ping Identity, dated 2011 (17 pages).

Oleg Cohen, "OAuth and SAML: Mobile meets enterprise", retrieved from http://assurebridge.com/blog/2013/05/13/oauth-and-saml-mobile-meets-enterprise/, dated May 13, 2013 (2 pages).

"Mobile SDK with CA Mobile API Gateway", CA Technologies, dated 2014 (2 pages).

Greg Curtis, "Rethinking Mobile SSO", retrieved from http://tech.blog.box.com/2013/03/rethinking-mobile-sso/, dated Mar. 12, 2013 (12 pages).

Hans Zandbelt, "Bootstrapping Browser SSO from mobile apps: Crossing the chasm", Ping Identity, dated Dec. 4, 2013 (5 pages).

"Single Sign-On for Desktop and Mobile Applications using SAML and OAuth", retrieved from https://developer.salesforce.com/page/Single_Sign-On_for_Desktop_and_Mobile_Applications_using_SAML_and_OAuth on Jan. 14, 2015 (17 pages).

* cited by examiner

TRANSFERRING AN AUTHENTICATED SESSION BETWEEN SECURITY CONTEXTS

TECHNICAL FIELD

This application relates generally to methods and apparatuses, including computer program products, for transferring an authenticated session between security contexts.

BACKGROUND

Mobile devices have become a common computing tool for customers to establish authenticated sessions with various computing resources for secure execution of transactions and workflows. Often, customers interact with a native application on a mobile device for part of a transaction, then desire to transition to additional functionality only offered by a web resource via a browser application on the device. For example, most native mobile applications are unable to perform certain transactions like charitable giving that run afoul of the terms and conditions of the third party that provides downloads of the application via an app store—so a native application requires a way to securely transfer the session to a web resource to continue the workflow.

In addition, the authors and/or providers of the native application may not be the same entity as the providers of the corresponding web resources—such that each entity may require different authentication requirements and contexts in order to use the respective computing services. Additionally, a native application may execute on the mobile device under a sandboxed process that is separate from the process of the web browser on the mobile device. While technologies that offer seamless transfer of a session between different entities/processes/contexts/service providers via a web browser are available today (e.g., cross-domain single sign-on (SSO), Security Assertion Markup Language (SAML)), seamless SSO transition from native mobile applications to web-based resources is challenging.

SUMMARY

Therefore, methods and systems are needed for seamlessly transferring an authenticated session between security contexts of a native application on a mobile device and a browser application on the mobile device, including but not limited to when the native application triggers launch of the browser application on the mobile device as a separate sandboxed process. The techniques described herein provide the advantage of leveraging SSO practices and systems along with responsive design experiences for mobile web applications to create a model for providing customers with a seamless transition of security context from native mobile apps to mobile-optimized experiences on the web. The techniques also allow a user to continue interacting securely with the same authenticated identity in the mobile device browser, as used with the native application, without having to log in again directly.

The techniques also enable a customer to seamlessly view web-based applications that might perform tasks not be allowed inside a native mobile application (e.g. charitable contributions) or that do not work properly in the native mobile application web view to be displayed in the default device browser instead. Instead of disrupting the customer experience to force the user to log in multiple times from the same device, the native app can seamlessly and efficiently transfer the authenticated session to the device browser application.

The invention, in one aspect, features a computerized method for transferring an authenticated session between security contexts. A mobile computing device establishes a first authenticated session between a native application and a server computing device via a communications network. The mobile device requests transfer of the first authenticated session to a browser application on the mobile device. The mobile device receives session transfer parameters from a first Security Assertion Markup Language (SAML) authentication system associated with the first authenticated session after transfer is requested, the session transfer parameters including a web address and a SAML security identifier. The mobile device directs the browser application to a second SAML authentication system using the session transfer parameters to initialize the browser application. The mobile device validates the SAML security identifier at the second SAML authentication system to generate an authentication credential for the mobile device. The mobile device authenticates the browser application to the server computing device using the generated authentication credential, and redirects the browser application to the server computing device to complete transfer of the first authenticated session.

The invention, in another aspect, features a system for transferring an authenticated session between security contexts. The system includes a mobile computing device configured to establish a first authenticated session between a native application and a server computing device via a communications network, and request transfer of the first authenticated session to a browser application on the mobile device. The mobile device is configured to receive session transfer parameters from a first Security Assertion Markup Language (SAML) authentication system associated with the first authenticated session after transfer is requested, the session transfer parameters including a web address and a SAML security identifier. The mobile device is configured to direct the browser application to a second SAML authentication system using the session transfer parameters to initialize the browser application, and validate the SAML security identifier at the second SAML authentication system to generate an authentication credential for the mobile device. The mobile device is configured to authenticate the browser application to the server computing device using the generated authentication credential, and redirect the browser application to the server computing device to complete transfer of the first authenticated session.

The invention, in another aspect, features a computer program product, tangibly embodied in a non-transitory computer readable storage device, for transferring an authenticated session between security contexts. The computer program product includes instructions operable to cause a mobile computing device to establish a first authenticated session between a native application and a server computing device via a communications network, and request transfer of the first authenticated session to a browser application on the mobile device. The computer program product includes instructions operable to cause the mobile computing device to receive session transfer parameters from a first Security Assertion Markup Language (SAML) authentication system associated with the first authenticated session after transfer is requested, the session transfer parameters including a web address and a SAML security identifier. The computer program product includes instructions operable to cause the mobile computing device to direct the browser application to a second SAML authentication system using the session transfer parameters to initialize the browser application, and validate the SAML security identifier at the second SAML authentication system to generate an authentication credential for the mobile device. The computer program product includes instructions operable to cause the mobile computing device to authenticate the browser application to the server computing device using the generated authentication credential, and redirect the browser application to the server computing device to complete transfer of the first authenticated session.

Any of the above aspects can include one or more of the following features. In some embodiments, the SAML security identifier is formatted for one-time use. In some embodiments, the web address points to the second SAML authentication system.

In some embodiments, during validation of the SAML security identifier at the second SAML authentication system, the mobile device transmits the SAML security identifier to the second SAML authentication system, and establishes a connection to the first SAML authentication system. The second SAML authentication receives a SAML identity from the first SAML authentication system, and requests resolution of the SAML security identifier from the first SAML authentication system based upon the SAML identity. The second SAML authentication system translates the received SAML identity into an internal identity associated with the server computing device, and generates the authentication credential based upon the internal identity.

In some embodiments, the server computing device and the second SAML authentication system are operated by the same entity. In some embodiments, the session transfer parameters include a relay parameter. In some embodiments, the mobile device identifies an application hosted by the server computing device based upon the relay parameter, and redirects the browser application to the identified application.

In some embodiments, the SAML security identifier is an encoded token. In some embodiments, the first authenticated session is established between the native application and the server computing device based upon login credentials received by the mobile device. In some embodiments, the mobile device requests additional credentials from a user of the mobile device if the SAML security identifier is not validated.

In some embodiments, the mobile device requests additional credentials from a user of the mobile device based upon a risk score generated by the second SAML authentication system during validation of the SAML security identifier. In some embodiments, the session transfer parameters include one or more attributes of the mobile device and the second SAML authentication system uses the attributes of the mobile device to validate the SAML security identifier. In some embodiments, the redirecting step establishes a second authenticated session between the browser application and the server computing device, and the native application and the server computing device remain connected via the first authenticated session.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
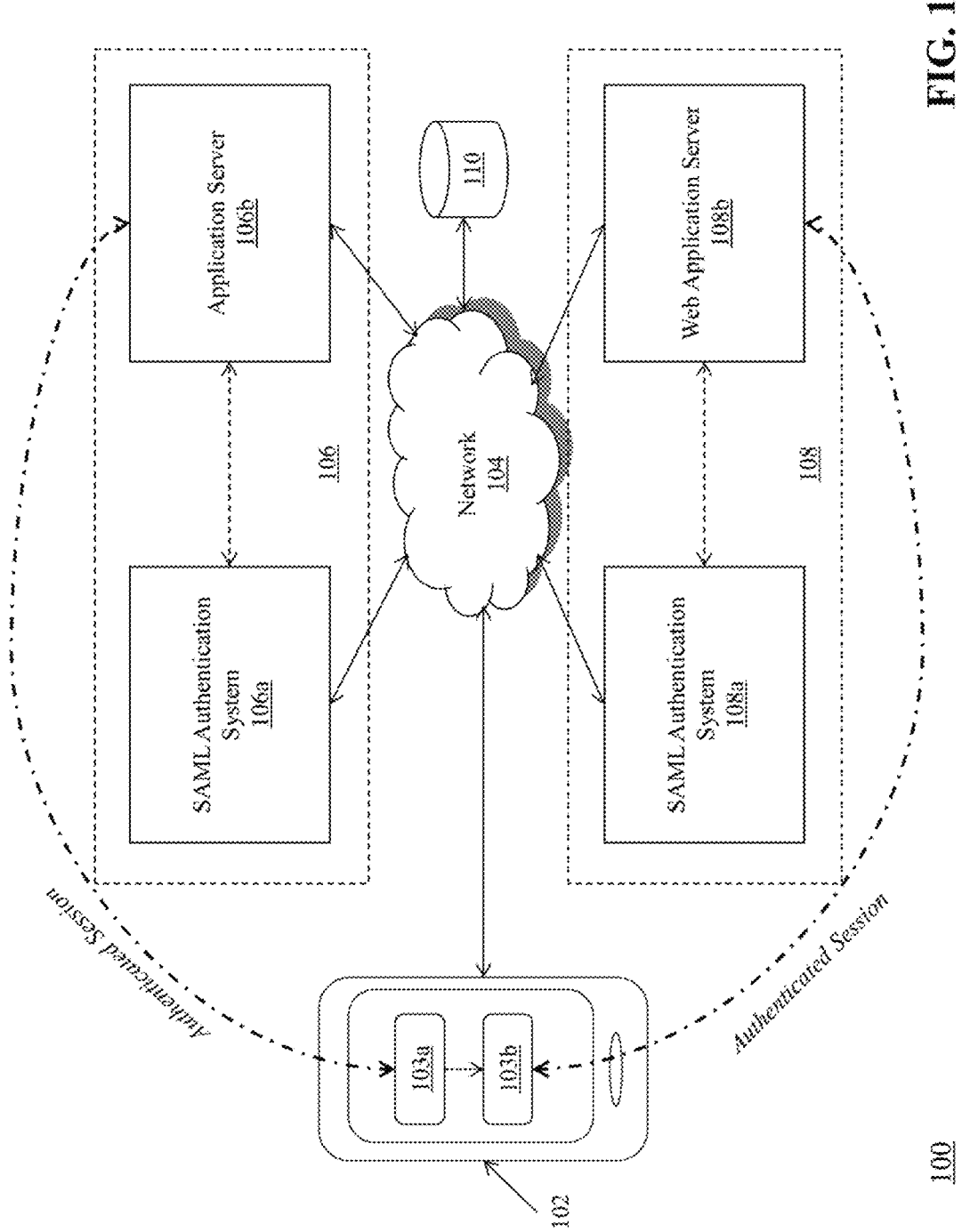
FIG. 1 is a block diagram of a system for transferring an authenticated session between security contexts.

FIG. 1 is a block diagram of a system 100 for transferring an authenticated session between security contexts. The system 100 includes a mobile device 102 executing a native application 103a and a browser application 103b, a communications network 104, a SAML authentication system 106a and an application server computing device 106b (collectively, 106), a SAML authentication system 108a and a web application server computing device 108b (collectively 108), and a database 110.

The mobile device 102 connects to the communications network 104 in order to communicate with the other components in the system 100 to provide input and receive output relating to the process of transferring an authenticated session between security contexts as described herein. Example mobile devices 102 can include, but are not limited to a smart phone (e.g., Apple iPhone®) or other mobile communications device, a portable video game system, a tablet computer, an internet appliance, a personal computer, or the like. In some examples, the mobile device 102 can be installed in a vehicle. The mobile device 102 can be configured to include an embedded digital camera apparatus, and a storage module (e.g., Flash memory) to hold photographs, video or other information captured with the camera. The mobile device 102 includes network-interface components to enable the user to connect to a communications network 104, such as the Internet, wireless network (e.g., GPRS, CDMA, RF), or the like.

The mobile device 102 also includes application software 103a, 103b to enable a user to view information and perform transactions associated with one or more application servers (e.g., server 106b, server 108b). The application software includes a native application 103a and a browser application 103b.

In some embodiments, the native application 103a is a software application (also called an 'app') to be installed locally on the mobile device 102 and written with programmatic code designed to interact with an operating system that is native to the mobile device 102. Such software is available from, e.g., the Apple® App Store or the Google® Play Store. In some embodiments, the browser application 103b is web browsing software (e.g., Safari available from Apple, Inc. or Firefox available from Mozilla) installed on the mobile device 102 to present web-based information (e.g., formatted in Hypertext Markup Language (HTML)) that is received from a web application server 106b, 108b and to contain links and other commands for navigation and/or execution of functionality. In some embodiments, The communication network 104 enables the other components of the system 100 to communicate with each other in order to perform the process of transferring an authenticated session between security contexts as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The SAML authentication system 106a is a computing device, or set of computing devices, that provides SAML authentication services to the mobile device 102. The SAML authentication system 106a can be associated with an application server 106b that is used by the native application 103a to transmit and receive information and perform transactions. For example, when a user of mobile device 102 launches the native application 103a to connect to the application server 106b, the native application 103a can first connect to the SAML authentication system 106a to perform an authentication procedure and establish a security context between the mobile device 102 and the application server 106b (e.g., generate and authenticate security credentials, establish a secure session, and so forth). Thus, the subsequent transactions and interaction between the native application 103a on the mobile device 102 and the application server 106b are secured according to the authentication provided by the SAML authentication system 106a. In some embodiments, the SAML authentication system 106a and the application server 106b are operated and/or managed by a single entity that also provided the native application 103a to the mobile device 102. For the purposes of this document, the single entity that manages/operates the components 106 can be called the 'identity provider.'

Similarly, the SAML authentication system 108a is a computing device, or set of computing devices, that provides SAML authentication services to the mobile device 102. The SAML authentication system 108a can be associated with a web application server 108b that is used by the browser application 103b to transmit and receive information and perform transactions. For example, as will be explained in greater detail below, when a user of mobile device 102 executes a function in the native application 103a that relies on application resources provided by web application server 108b, the native application 103a can launch the browser application 103b as a separate sandboxed process, and provide the browser with certain session transfer parameters that enable the browser to seamlessly authenticate using the SAML authentication system 108a to establish a security context for an authenticated session between the mobile device 102 and the web application server 108b, so that the user can, e.g., receive additional information provided by the server 108b or continue a transaction workflow initiated in the native application 103a, without requiring the user to provide separate authentication credentials to use the server 108b. This is also called a single sign-on (SSO) procedure because the user only has to provide authentication credentials once (e.g., when first launching the native application 103a).

In some embodiments, the SAML authentication system 108a and the web application server 108b are operated and/or managed by an entity that can be different than the entity (described above) that provided the native application 103a to the mobile device 102—meaning that the entities may have different identities/authentication credentials/procedures for the user. For example, the entity that provided the native application 103a and manages the components 106 can be a charitable giving organization and the entity that manages the components 108 can be a financial institution.

Continuing with this example, due to restrictions on native applications imposed by a third-party company that manages the repository from which the native applications are downloaded to the mobile device 102, the native application 103a may not be able to include certain transactions or workflows (e.g., charitable giving donations) within the application 103a itself. Therefore, it may be desirable to invoke the browser application 103b and seamlessly transfer the authenticated session to the browser application so that the user can continue with a desired transaction or workflow provided by the web application server 108b that is not supported in the native application 103a. For the purposes of this document, the entity that manages/operates the components 108 can be called the 'service provider.'

Of course, it should be appreciated that a single entity be both the 'identity provider' and the 'service provider'—that is, the entity can operate and/or manage both components 106 and components 108. For example, the components 106 and 108 may be operated by a financial institution that offers an app 103a for charitable giving account management and also provides web services (via server 108b) for actually performing charitable donation transactions connected to the app.

Also, although the respective SAML authentication systems 106a, 108a and the respective servers 106b, 108b are shown in FIG. 1 as being located on separate computing devices, in some embodiments the functionality of respective SAML authentication systems 106a, 108a and the respective servers 106b, 108b can be situated on a single computing device. It should be appreciated that any number of computing devices, arranged in a variety of architectures, resources, and configurations (e.g., cluster computing, virtual computing, cloud computing) can be used without departing from the scope of the invention.

The system 100 also includes a database 110. The database 110 is coupled to the other components 106, 108 of the system 100 and stores data used by the components 106, 108 to perform the process of transferring an authenticated session between security contexts as described herein. The database 110 can be integrated with one or more of the computing devices on which the various components 106, 108 operate, or be located on a separate computing device. An example database that can be used with the system 100 is MySQL™ available from Oracle Corp. of Redwood City, Calif.

Figure 2:
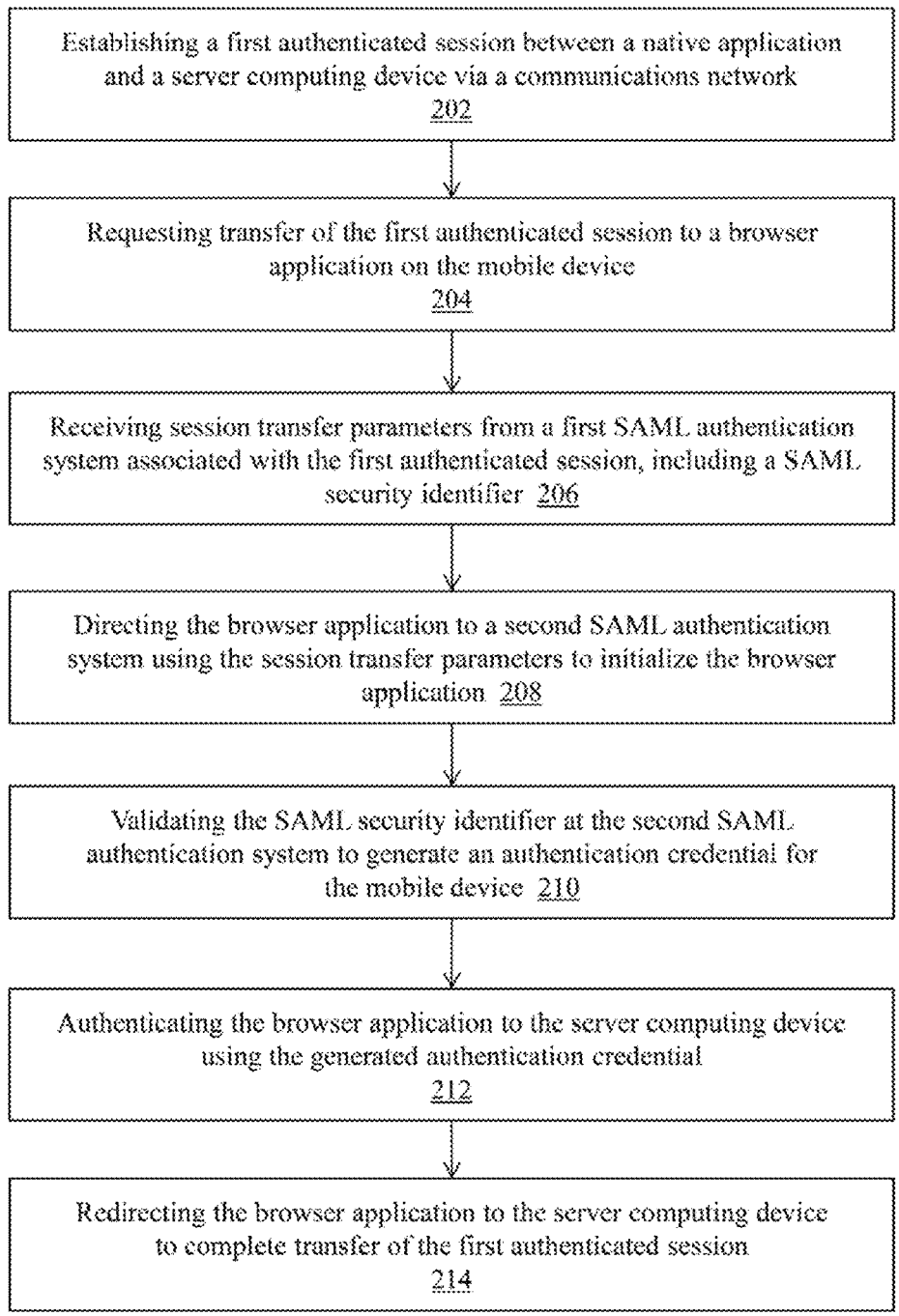
FIG. 2 is a flow diagram of a method for transferring an authenticated session between security contexts.

FIG. 2 is a flow diagram of a method 200 for transferring an authenticated session between security contexts, using the system 100 of FIG. 1. A mobile computing device (e.g., mobile device 102) establishes (202) a first authenticated session between a native application 103a and a server computing device (e.g., application server 106b) via a communications network 104. The mobile device 102 requests (204) transfer of the first authenticated session to a browser application 103b on the mobile device 102. The mobile device 102 receives (206) session transfer parameters from a first Security Markup Authentication Language (SAML) authentication system 106a after the transfer is requested. The session transfer parameters include a web address and a SAML security identifier.

The mobile device 102 directs (208) the browser application 103b to a second SAML authentication system 108a using the session transfer parameters to initialize the browser application. The mobile device 102 validates (210) the SAML security identifier at the second SAML authentication system 108a to generate an authentication credential for the mobile device 102. The mobile device 102 authenticates (212) the browser application 103b to the server computing device (e.g., web application server 108b) using the generated authentication credential. The mobile device 102 redirects (214) the browser application 103b to the server computing device (e.g., web application server 108b) to complete transfer of the first authenticated session.

Figure 3:
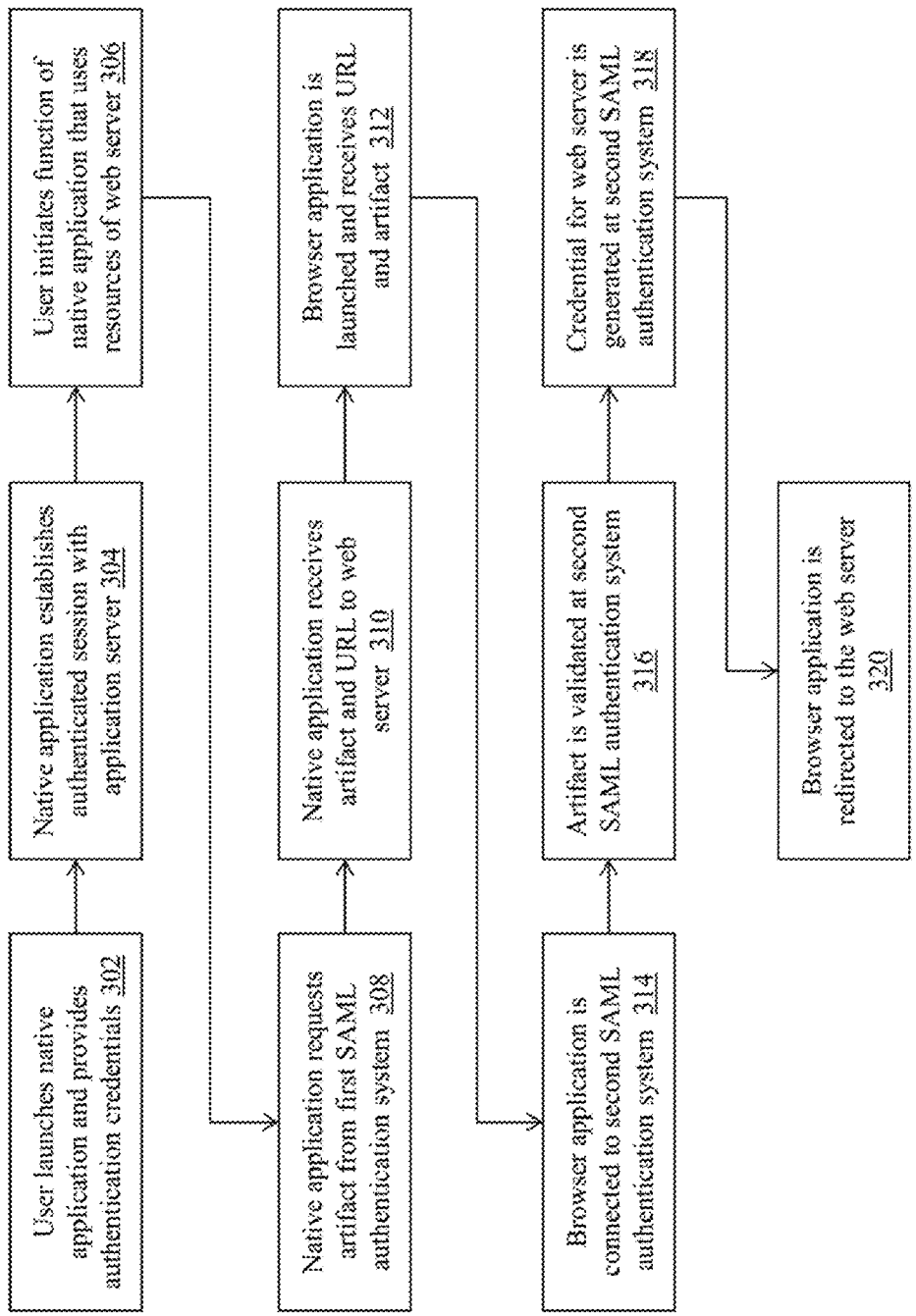
FIG. 3 is a detailed flow diagram of a method for transferring an authenticated session between security contexts.

An embodiment of the method 200 of FIG. 2 will now be described in greater detail with respect to FIGS. 3 and 4. FIG. 3 is a detailed flow diagram of a method 300 for transferring an authenticated session between security contexts. A user of mobile device 102 launches (302) the native application 103a and provides authentication credentials (e.g., username, password) to the application 103a. In some embodiments, the mobile device 102 can automatically authenticate the user to the application 103a without requiring any input from the user. The native application 103a connects to the application server 106b configured to provide information and resources for the native application 103a and establishes (304) an authenticated session with the application server 106b. For example, the native application 103a supplies the authentication credentials to the application server 106b, which verifies the credentials (e.g., against a user profile stored in database 110) and returns a notification to the native application 103a that the credentials have been authenticated and the user is authorized to use the native application 103a.

As described previously, the user can use various functions of the native application 103a after being authenticated. For example, if the application is a charitable giving account management application, the user can review his giving account balance, recent transactions, information about new charities, and so forth. The native application 103a can communicate with the application server 106b via the authenticated session to transmit and receive information relating to these functions.

In some cases, however, the native application 103a is not configured to or capable of conducting certain transactions or workflows (e.g., performing charitable giving transactions) due to restrictions that, for example, are placed on the application by third parties such as the operator of a repository from which the native application 103a is downloaded and installed on the mobile device 102. As referenced above, companies like Apple, Inc. impose restrictions on the functionality of apps provided by their App Store, such as not allowing apps to execute donation transactions natively within the application itself. Therefore, the native application 103a must use a web browser or similar functionality in order to conduct the donation transaction. And, often the entity that provides the services to execute the donation transaction (i.e., a financial institution that manages the charitable giving account) is different than the entity that provides the native application functionality (i.e., a charity). Therefore, to provide a seamless experience for the user, it is desirable to perform a single sign-on procedure to transfer the authenticated session to a browser of the mobile device 102 to leverage resources of another entity, all without requiring additional authentication credentials from the user.

With that framework in mind and referring back to FIG. 3, the user of mobile device 102 initiates (306) a function of the native application 103a (e.g., a request to donate funds to charity from a charitable giving account) that must use browsing functionality of the mobile device 102 to connect to resources provided by a web application server 108b. For example, a user clicks a button in the native app 103a to donate to a specific charity.

The native application 103a launches web browser software installed on the mobile device 102 and concurrently requests (308) a SAML security identifier (e.g., a SAML artifact including a SAML assertion) from a first SAML authentication system 106a associated with the application server 106b. It should be appreciated that the first SAML authentication system 106a passes the artifact to the native application 103a to limit the size of the parameter passed and to protect the SAML assertion from exposure on the mobile device 102. Also, in some embodiments, the SAML artifact is formatted for one-time use.

The native application 103a receives (310) the SAML artifact from the first SAML authentication system 106a. The native application 103a also receives a web address (e.g., a Uniform Resource Locator (URL)) from the first SAML authentication system 106a that references a web resource (e.g., web application server 108b) associated with the desired function that was selected by the user in the native app 103a. For example, the URL can be associated with a SAML authentication system (or other web service) of the financial institution that provides the charitable giving transaction functionality that is prohibited directly in the native app. The web resource referenced by the URL is also called the assertion consumer. In some embodiments, the native application 103a also receives a relay state parameter (e.g., a deep link) from the first SAML authentication system 106a as part of the URL, where the relay state parameter identifies a specific application or resource of the web application server 108b to which the browser should be eventually directed to perform the desired transaction or workflow.

The browser application 103b receives (312) the SAML artifact and the web address (e.g., URL and optional relay state parameter) from the native application 103a. The browser 103b uses the web address to connect (314) to a second SAML authentication system 108a that is associated with the web application server 108b. For example, the second SAML authentication system 108a can be associated with the financial institution that provides the charitable giving transaction functionality that is prohibited directly in the native app and which, in some cases, is a different entity than the entity that provided the native application 103a. In some embodiments, the second SAML authentication system 108a can invoke additional authentication workflows with respect to the mobile device 102. Examples include challenges using a token or knowledge-based authentication (KBA).

The second SAML authentication system 108a validates (316) the SAML artifact by, e.g., resolving the SAML artifact against the first SAML authentication system 106a directly through a signed SAML ArtifactResolution call. The second SAML authentication system 108a processes the authentication assertion and translates the SAML identity received from the first SAML authentication system 106a into an internal identity associated with the web application server 108b and/or the desired web resource. For example, if the user of the mobile device 102 maintains a charitable giving account with the financial institution that operates the components 108, the financial institution may have its own internal identity (e.g., a user account, a user profile, a user ID) for the user that is different than the identity maintained by the entity that operates the components 106. Therefore, translation of the SAML identity to an internal identity may be advantageous for, e.g., security, identification, compliance, and processing efficiency purposes on the part of the financial institution.

The second SAML authentication system 108a generates (318) an authentication credential associated with the web application server 108b and/or web resource for performing the desired transaction via the browser 103b, based upon the internal identity. The second SAML authentication system 108a then redirects (320) the browser application 103b to the web application server 108b to an appropriate resource or application in order to continue with the desired transaction (e.g., charitable giving transaction). At this point, an authenticated session is seamlessly established between the browser application 103b on the mobile device 102 and the web application server 108b.

As mentioned above, the second SAML authentication system 108a can use a relay state parameter to redirect the browser application 103a to a specifically-identified resource at the web application server 108*b*. In some embodiments, the web application server 108*b* can challenge the mobile device 102 and/or the user of the mobile device to perform additional authentication workflows (e.g., KBA challenge if the user presents a high risk score, a token challenge) once the authenticated session is established between the browser application 103*b* on the mobile device 102 and the web application server 108*b*.

Also, it should be appreciated that while the above embodiments are described to show a transfer of the authenticated session between the native application 103*a* and the server 106*b* to between the browser application 103*b* and the server 108*b*, in some embodiments the methods and systems described herein establish a second authenticated session between the browser application 103*b* and the server 108*b* while maintaining the first authenticated session between the native application 103*a* and the server 106*b*. Additionally, in some embodiments the application server 106*b* and the web application server 108*b* can be located on the same server computing device that provides resources to both the native application 103*a* and the browser application 103*b*.

Figure 4:
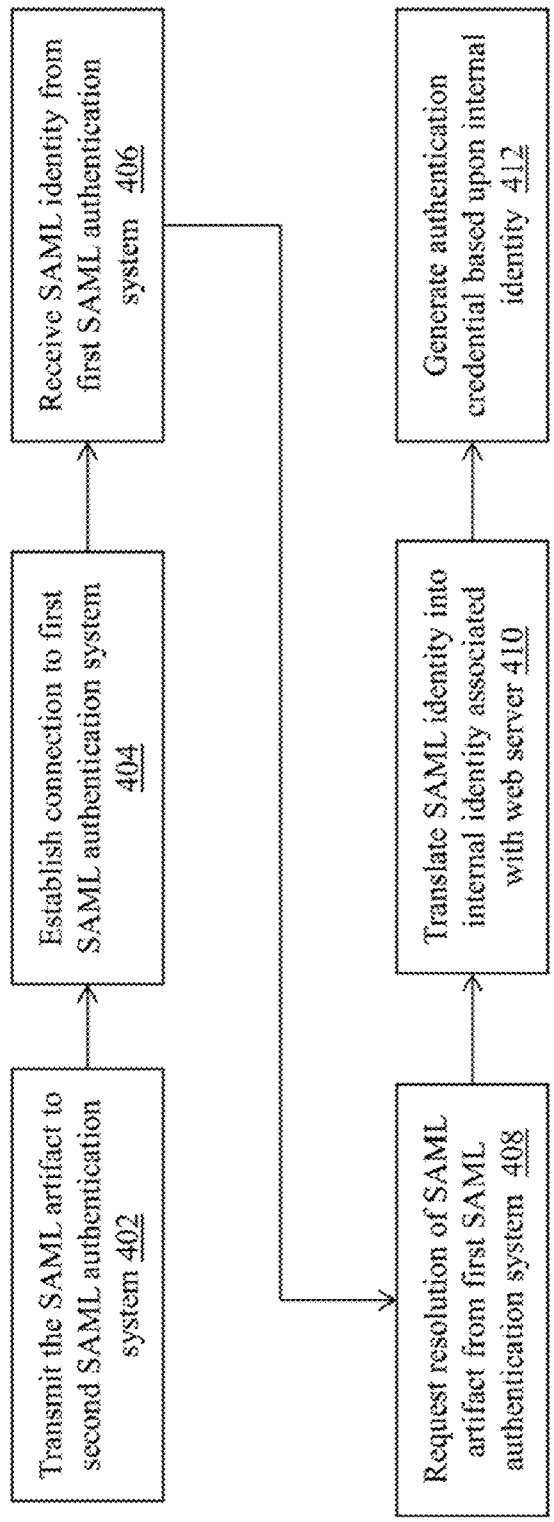
FIG. 4 is a detailed flow diagram of a method for validating a SAML security identifier to generate an authentication credential.

FIG. 4 is a detailed flow diagram of a method 400 for validating a SAML security identifier (e.g., a SAML artifact) to generate an authentication credential. As mentioned above with respect to FIG. 3, the second SAML authentication system 108*a* validates the SAML artifact. The mobile device 102 transmits the SAML artifact to the second SAML authentication system 108*a*, and the second SAML authentication system establishes (404) a connection to the first SAML authentication system, e.g., operated by the identity provider. The second SAML authentication system 108*a* receives (406) a SAML identity from the first SAML authentication system 106*a* based upon the SAML artifact. The second SAML authentication system 108*a* requests (408) a resolution of the SAML artifact from the first SAML authentication system 106*a*, e.g., via a signed SAML ArtifactResolution call and, upon resolution by the first SAML authentication system 106*a*, the second system 108*a* translates (410) the SAML identity into an internal identity, e.g., for the operator of the components 108. The second SAML authentication system 108*b* generates (412) an authentication credential based upon the internal identity, where the authentication credential is used to authenticate the user to the web application server 108*b*/web resource that the user desires to access.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for transferring an authenticated session between security contexts, the method comprising:
    establishing, on a mobile computing device, a first authenticated session between a native application and a server computing device via a communications network;
    requesting, by the mobile device, transfer of the first authenticated session to a browser application on the mobile device;
    receiving, by the mobile device, session transfer parameters from a first Security Assertion Markup Language (SAML) authentication system associated with the first authenticated session after transfer is requested, the session transfer parameters including a web address and a SAML security identifier;
    directing, by the mobile device, the browser application to a second SAML authentication system using the session transfer parameters to initialize the browser application;
    validating, by the second SAML authentication system, the SAML security identifier to generate an authentication credential for the mobile device, comprising
        transmitting, by the mobile device, the SAML security identifier to the second SAML authentication system;
        establishing, by the second SAML authentication system, a connection to the first SAML authentication system;
        receiving, by the second SAML authentication system, a SAML identity from the first SAML authentication system;
        requesting, by the second SAML authentication system, resolution of the SAML security identifier from the first SAML authentication system based upon the SAML identity;
        translating, by the second SAML authentication system, the received SAML identity into an internal identity associated with the server computing device; and
        generating, by the second SAML authentication system, the authentication credential based upon the internal identity;
    authenticating, by the mobile device, the browser application to the server computing device using the generated authentication credential; and
    redirecting, by the mobile device, the browser application to the server computing device to complete transfer of the first authenticated session.

2. The method of claim 1, wherein the SAML security identifier is formatted for one-time use.

3. The method of claim 1, wherein the web address points to the second SAML authentication system.

4. The method of claim 1, wherein the server computing device and the second SAML authentication system are operated by the same entity.

5. The method of claim 1, wherein the session transfer parameters include a relay parameter.

6. The method of claim 5, wherein the redirecting step comprises
    identifying an application hosted by the server computing device based upon the relay parameter; and
    redirecting the browser application to the identified application.

7. The method of claim 1, wherein the SAML security identifier is an encoded token.

8. The method of claim 1, wherein the first authenticated session is established between the native application and the server computing device based upon login credentials received by the mobile device.

9. The method of claim 1, further comprising requesting, by the mobile device, additional credentials from a user of the mobile device if the SAML security identifier is not validated.

10. The method of claim 1, further comprising requesting, by the mobile device, additional credentials from a user of the mobile device based upon a risk score generated by the second SAML authentication system during validation of the SAML security identifier.

11. The method of claim 1, wherein the session transfer parameters include one or more attributes of the mobile device and the second SAML authentication system uses the attributes of the mobile device to validate the SAML security identifier.

12. The method of claim 1, wherein the redirecting step establishes a second authenticated session between the browser application and the server computing device, and the native application and the server computing device remain connected via the first authenticated session.

13. A system for transferring an authenticated session between security contexts, the system comprising a mobile computing device configured to:
　establish a first authenticated session between a native application and a server computing device via a communications network;
　request transfer of the first authenticated session to a browser application on the mobile device;
　receive session transfer parameters from a first Security Assertion Markup Language (SAML) authentication system associated with the first authenticated session after transfer is requested, the session transfer parameters including a web address and a SAML security identifier;
　direct the browser application to a second SAML authentication system using the session transfer parameters to initialize the browser application;
　validate the SAML security identifier at the second SAML authentication system to generate an authentication credential for the mobile device, comprising establishing a connection to the first SAML authentication system;
　　receiving a SAML identity from the first SAML authentication system;
　　requesting resolution of the SAML security identifier from the first SAML authentication system based upon the SAML identity;
　　translating the received SAML identity into an internal identity associated with the server computing device; and
　　generating the authentication credential based upon the internal identity;
　authenticate the browser application to the server computing device using the generated authentication credential; and
　redirect the browser application to the server computing device to complete transfer of the first authenticated session.

14. The system of claim 13, wherein the SAML security identifier is formatted for one-time use.

15. The system of claim 13, wherein the web address points to the second SAML authentication system.

16. The system of claim 13, wherein the server computing device and the second SAML authentication system are operated by the same entity.

17. The system of claim 13, wherein the session transfer parameters include a relay parameter.

18. The system of claim 17, for the redirecting step, the mobile device is further configured to
　identify an application hosted by the server computing device based upon the relay parameter; and
　redirect the browser application to the identified application.

19. The system of claim 13, wherein the SAML security identifier is an encoded token.

20. The system of claim 13, wherein the first authenticated session is established between the native application and the server computing device based upon login credentials received by the mobile device.

21. The system of claim 13, wherein the mobile device is further configured to request additional credentials from a user of the mobile device if the SAML security identifier is not validated.

22. The system of claim 13, wherein the mobile device is further configured to additional credentials from a user of the mobile device based upon a risk score generated by the second SAML authentication system during validation of the SAML security identifier.

23. The system of claim 13, wherein the session transfer parameters include one or more attributes of the mobile device and the second SAML authentication system uses the attributes of the mobile device to validate the SAML security identifier.

24. The system of claim 13, wherein the redirecting step establishes a second authenticated session between the browser application and the server computing device, and the native application and the server computing device remain connected via the first authenticated session.

25. A computer program product, tangibly embodied in a non-transitory computer readable storage device, for transferring an authenticated session between security contexts, the computer program product including instructions operable to cause a mobile computing device to:
　establish a first authenticated session between a native application and a server computing device via a communications network;
　request transfer of the first authenticated session to a browser application on the mobile device;
　receive session transfer parameters from a first Security Assertion Markup Language (SAML) authentication system associated with the first authenticated session after transfer is requested, the session transfer parameters including a web address and a SAML security identifier;
　direct the browser application to a second SAML authentication system using the session transfer parameters to initialize the browser application;
　validate the SAML security identifier at the second SAML authentication system to generate an authentication credential for the mobile device, comprising establishing a connection to the first SAML authentication system;
　　receiving a SAML identity from the first SAML authentication system;
　　requesting resolution of the SAML security identifier from the first SAML authentication system based upon the SAML identity;
　　translating the received SAML identity into an internal identity associated with the server computing device; and
　　generating the authentication credential based upon the internal identity;
　authenticate the browser application to the server computing device using the generated authentication credential; and
　redirect the browser application to the server computing device to complete transfer of the first authenticated session.

* * * * *